(12) United States Patent
Yang

(10) Patent No.: US 10,608,457 B2
(45) Date of Patent: Mar. 31, 2020

(54) CHARGING CIRCUIT AND METHOD OF CONTROLLING CHARGING

(71) Applicant: Getac Technology Corporation, Hsinchu County (TW)

(72) Inventor: Shih-Hung Yang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 54 days.

(21) Appl. No.: 16/021,697

(22) Filed: Jun. 28, 2018

(65) Prior Publication Data

US 2020/0006951 A1  Jan. 2, 2020

(51) Int. Cl.
*H02J 7/00* (2006.01)

(52) U.S. Cl.
CPC ............ *H02J 7/008* (2013.01); *H02J 7/0029* (2013.01); *H02J 7/00302* (2020.01); *H02J 7/00308* (2020.01)

(58) Field of Classification Search
CPC ...................................................... H02J 7/008
USPC ......................................................... 320/134
See application file for complete search history.

(56) References Cited

U.S. PATENT DOCUMENTS 8,232,772 B2 * 7/2012 Lai ..................... H02J 7/0031
                                                              320/134
2010/0315042 A1  12/2010 Wei

FOREIGN PATENT DOCUMENTS

CN   1179640 A   4/1998
CN   205693385 U  11/2016
TW   201810859 A   3/2018

OTHER PUBLICATIONS

Taiwan Patent Office, "Office Action", dated Dec. 26, 2018, Taiwan.

* cited by examiner

*Primary Examiner* — Edward Tso
*Assistant Examiner* — Ahmed H Omar
(74) *Attorney, Agent, or Firm* — Locke Lord LLP; Tim Tingkang Xia, Esq.

(57) ABSTRACT

A method of controlling charging includes: receiving an input voltage; receiving by a control unit a detected voltage related to the input voltage; outputting a conducting voltage from the control unit when the detected voltage falls within an operation range; outputting an operating voltage to a detection pin of a charging unit according to the conducting voltage; outputting a charging current from the charging unit according to the input voltage when the detection pin receives the operating voltage; and not outputting the conducting voltage from the control unit when the detected voltage falls outside the operation range.

12 Claims, 4 Drawing Sheets

CHARGING CIRCUIT AND METHOD OF CONTROLLING CHARGING

BACKGROUND OF THE INVENTION

Field of the Invention

The present disclosure relates to charging technology and, more particularly, to a charging circuit and a method of controlling charging.

Description of the Prior Art

Owing to technological advancements, portable electronic products, such as mobile phones, laptops and tablets, are becoming more popular and robust. In the absence of an external power supply, portable electronic products must be equipped with a rechargeable battery for supplying the power required for its operation.

After the rechargeable battery has run out of power, a user connects a charger to an external power supply and then charges the rechargeable battery with the charger.

SUMMARY OF THE INVENTION

In a charging process, a charging integrated circuit (IC) inside a charger detects an input voltage and restricts the range of the input voltage, so as to protect the security of a backend circuit. As a result, its application is too limited to be applicable to the use of external power supplied by automobile batteries and direct use of an adapter operating at variable voltage, for example. In view of this, the present disclosure provides a charging circuit and a method of controlling charging, to replace the charging IC with a control unit for monitoring the input voltage and controlling the operation of the charging IC, so as to not only increase an appropriate range of the input voltage but also prevent leakage current from happening to a power output end before charging.

In an embodiment, a method of controlling charging, comprising the steps of: receiving an input voltage; receiving by a control unit a detected voltage related to the input voltage; outputting a conducting voltage from the control unit when the detected voltage falls within an operation range; outputting an operating voltage to a detection pin of a charging unit according to the conducting voltage; outputting a charging current from the charging unit according to the input voltage when the detection pin receives the operating voltage; and not outputting the conducting voltage from the control unit when the detected voltage falls outside the operation range.

In an embodiment, a charging circuit, comprising a power input end, a power output end, a voltage detection circuit, a control unit, a conversion unit, and a charging unit. The power input end receives an input voltage. The power output end outputs a charging current. The voltage detection circuit is coupled to the power input end to output a detected voltage according to the input voltage. The detected voltage is related to the input voltage. The control unit is coupled to the voltage detection circuit to detect the detected voltage according to an operation range. The control unit outputs a conducting voltage when the detected voltage falls within the operation range but does not output the conducting voltage when the detected voltage falls outside the operation range. The conversion unit is coupled to the control unit to output an operating voltage according to the conducting voltage. The charging unit is coupled between the power input end and the power output end. The charging unit has a detection pin. The detection pin is coupled to the conversion unit. The charging unit generates a charging current according to the input voltage when the detection pin receives the operating voltage.

The fine features and advantages of the present disclosure are sufficiently illustrated with embodiments below to allow persons skilled in the art to gain insight into the technical contents of the present disclosure and implement the present disclosure accordingly. Furthermore, persons skilled in the art readily understand related objectives and advantages of the present disclosure by making reference to the disclosure contained in the specification, claims, and drawings of the present disclosure.

DETAILED DESCRIPTION OF THE EMBODIMENTS

Figure 1:
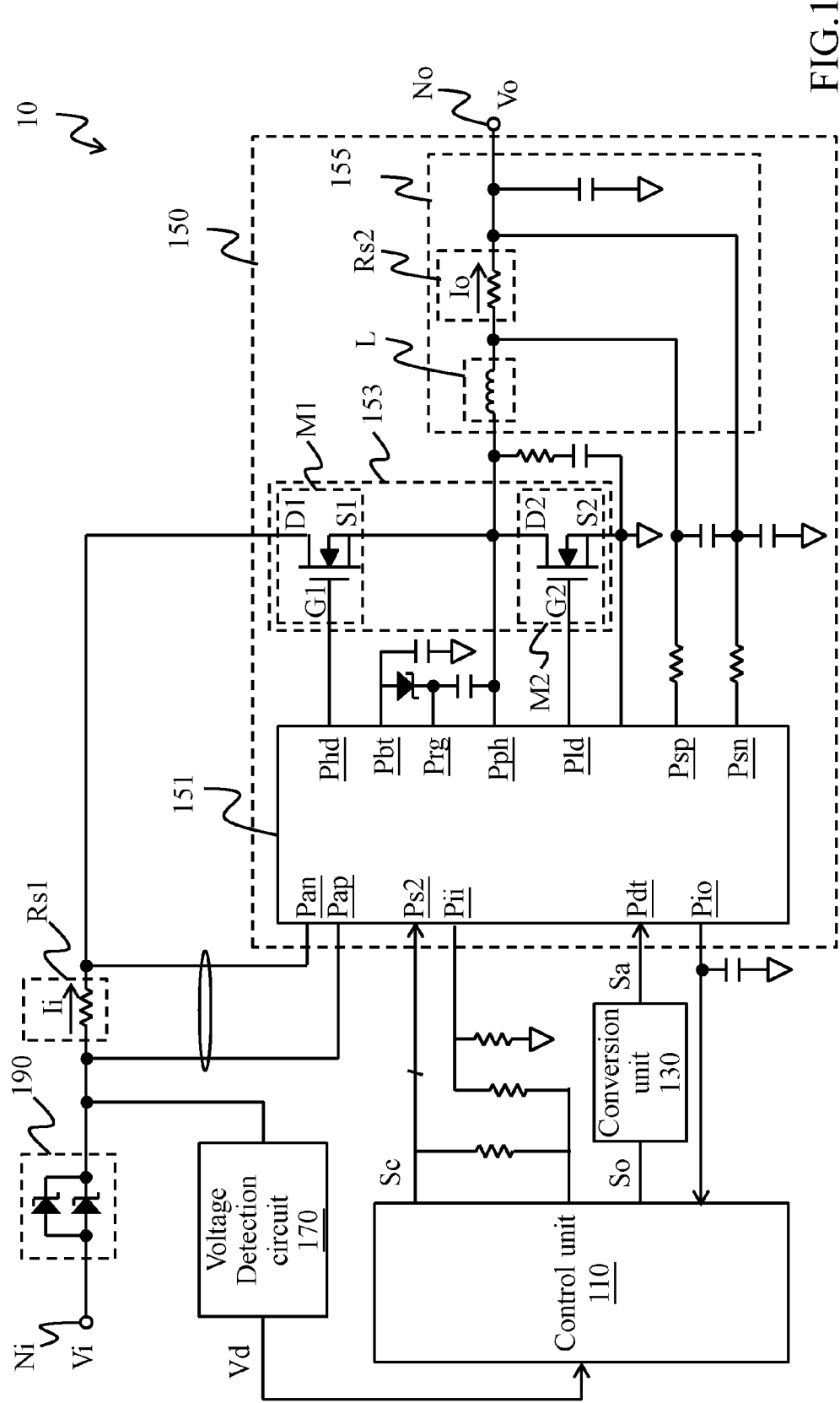
FIG. 1 is a schematic view of a charging circuit according to an embodiment of the present disclosure.

Referring to FIG. 1, a charging circuit 10 comprises a power input end Ni, a power output end No, a control unit 110, a conversion unit 130, a charging unit 150, and a voltage detection circuit 170. The control unit 110 is electrically connected to the power input end Ni. The conversion unit 130 is coupled between the control unit 110 and the charging unit 150. The charging unit 150 is coupled between the power input end Ni and the power output end No. The charging unit 150 has a detection pin Pdt. The detection pin Pdt is coupled to the conversion unit 130. The voltage detection circuit 170 is coupled between the power input end Ni and the control unit 110. The control unit 110 has an operation range.

Figure 2:
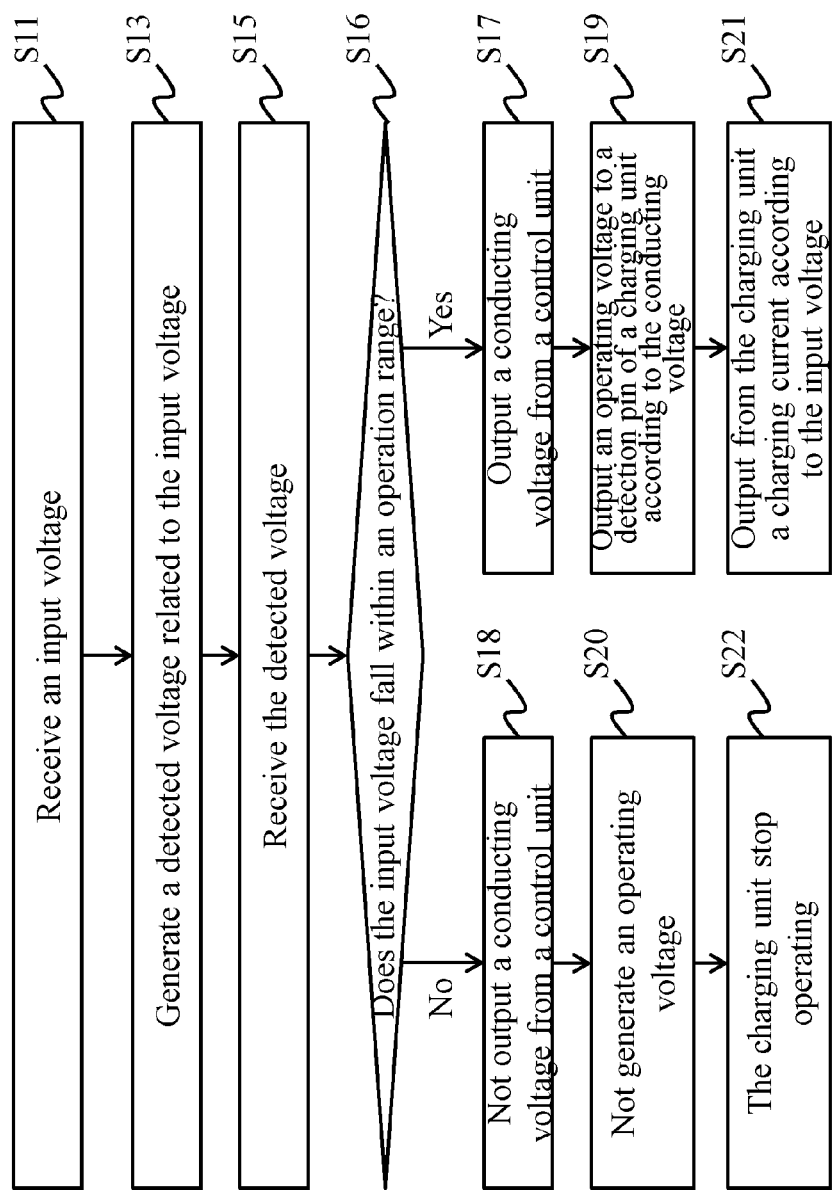
FIG. 2 is a flowchart of a method of controlling charging according to an embodiment of the present disclosure.

Referring to FIG. 1 and FIG. 2, the power input end Ni receives an input voltage Vi from an external power supply (not shown) of the charging circuit 10 (step S11). The voltage detection circuit 170 retrieves the input voltage Vi to thereby generate a detected voltage Vd related to the input voltage Vi (step S13). The control unit 110 receives the detected voltage Vd (step S15) and confirms whether the detected voltage Vd falls within an operation range (step S16). The ratio of the detected voltage Vd to the input voltage Vi is fixed.

The control unit 110 outputs a conducting voltage So to the conversion unit 130, when the detected voltage Vd falls within the operation range (step S17). The conversion unit 130 outputs an operating voltage Sa to the detection pin Pdt of the charging unit 150 according to the conducting voltage So (step S19). The charging unit 150 outputs a charging current Io according to the input voltage Vi when the detection pin Pdt receives the operating voltage Sa (step S21).

If the detected voltage Vd falls outside the operation range, the control unit 110 does not output the conducting voltage So (step S18); meanwhile, the conversion unit 130 cannot output the operating voltage Sa to the detection pin Pdt of the charging unit 150 (step S20), thereby causing the charging unit 150 to stop operating (step S22).

In some embodiments, the charging unit 150 comprises a charging integrated circuit (IC) 151, a switch circuit 153, and an output-stage circuit 155. The charging IC 151 is electrically connected to the power input end Ni. The switch circuit 153 is electrically connected between the power input end Ni and the output-stage circuit 155. A current detection resistor Rs1 is coupled between the power input end Ni and the switch circuit 153. The output-stage circuit 155 is coupled between the output-stage circuit 155 and the power output end No. The output-stage circuit 155 comprises an output inductor L and a current detection resistor Rs2. The output inductor L is coupled to the switch circuit 153. The current detection resistor Rs2 is coupled between the output inductor L and the power output end No. In some embodiments, the output-stage circuit 155 further comprises an output capacitor coupled between the power output end No and the ground.

The charging IC 151 in normal operation detects an input current Ii through the current detection resistor Rs1, detects the charging current Io through the current detection resistor Rs2, and/or detects an output voltage Vo and controls the operation of the switch circuit 153 according to the detection results of the input current Ii, the charging current Io and/or the output voltage Vo. Under the control of the charging IC 151, the switch circuit 153 receives the input current Ii through the current detection resistor Rs1 and controls the charging and discharging time of the output inductor L according to the input current Ii such that the output-stage circuit 155 can output stable DC output voltage, thereby supplying the charging current Io to an external load (such as a battery module) through the power output end No.

In some embodiments, the switch circuit 153 comprises a first transistor M1 and a second transistor M2. A control end G1 of the first transistor M1 and a control end G2 of the second transistor M2 are coupled to the charging IC 151. The first end D1 of the first transistor M1 is electrically connected to the power input end Ni through the current detection resistor Rs1. The second end S1 of the first transistor M1 and the first end D2 of the second transistor M2 are coupled to each other and jointly coupled to the charging IC 151 and the output inductor L of the output-stage circuit 155. The second end S2 of the second transistor M2 is coupled to the ground.

In some embodiments, the charging IC 151 has a plurality of pins comprising the detection pin Pdt, input current detection pins Pan, Pap, a command input pin Ps2, a current-limiting pin Pii, a current feedback pin Pio, switch-controlling pins Phd, Pld, a drive output pin Prg, switch-driving pins Pbt, Pph, and output current detection pins Psn, Psp.

The input current detection pins Pan, Pap are electrically connected to two ends of the current detection resistor Rs1, respectively, and measure the input current Ii through the current detection resistor Rs1. The output current detection pins Psn, Psp are electrically connected to two ends of the current detection resistor Rs2, respectively, and measure the charging current Io through the current detection resistor Rs2. The command input pin Ps2 is electrically connected to the control unit 110. If the control unit 110 determines that the detected voltage Vd falls within the operation range, the control unit 110 not only outputs the conducting voltage So, but also outputs a control command Sc to the command input pin Ps2. In some embodiments, the command input pin Ps2 and the control unit 110 are coupled together by a bus. The bus includes but is not limited to a system management bus (SMBus or SMB).

The current-limiting pin Pii is electrically connected to the control unit 110 and receives current limitation from the control unit 110. The current feedback pin Pio is electrically connected to the control unit 110 and outputs a feedback current limitation to the control unit 110 according to the input current Ii or the charging current Io. The switch-controlling pins Phd, Pld are coupled to the control ends G1, G2 of the switch circuit 153. The charging IC 151 outputs a switch signal to the switch circuit 153 through the switch-controlling pins Phd, Pld to control the switch circuit 153. The drive output pin Prg is electrically connected to the switch-driving pins Pbt, Pph through external diode and capacitor, respectively. The charging IC 151 outputs a driving signal through the drive output pin Prg and drives an internal output circuit of the switch signal through the switch-driving pins Pbt, Pph. The switch-driving pin Pph is further coupled to the switch circuit 153 (the second end S1 of the first transistor M1 and the first end D2 of the second transistor M2). In some embodiments, the first end D1 and the second end S1 of the first transistor M1 are a drain and a source, respectively. The control end G1 of the first transistor M1 is a gate. In some embodiments, the first end D2 and the second end S2 of the second transistor M2 are a drain and a source, respectively, and the control end G2 of the second transistor M2 is a gate.

In some embodiments, the charging IC 151 has an allowable range which the operating voltage Sa falls within. The operation range of the control unit 110 is greater than the allowable range. The allowable range is a voltage range comprising the first voltage level and the second voltage level. The first voltage level and the second voltage level are different but fixed. Hence, the operating voltage Sa stands between the first voltage level and the second voltage level. In an exemplary embodiment, the first voltage level and the second voltage level are 2.4V and 3.15V, respectively.

In some embodiments, the operation range is a voltage range comprising a third voltage level and a fourth voltage level. The third voltage level is less than the first voltage level, and/or the fourth voltage level is less than the second voltage level. In an exemplary embodiment, the operation range depends on a withstanding voltage of the control unit 110.

In some embodiments, the charging IC 151 detects whether a voltage signal received by the detection pin Pdt falls within the allowable range. If the voltage signal received by the detection pin Pdt falls within the allowable range (that is, the detection pin Pdt has received the operating voltage Sa), the charging IC 151 generates an appropriate signal. If the voltage signal received by the detection pin Pdt does not fall within the allowable range (that is, the detection pin Pdt has not received the operating voltage Sa), the charging IC 151 does not generate the appropriate signal. In an exemplary embodiment, the operating voltage Sa is a voltage signal of the first level. Hence, if the voltage signal is of the second level different from the first level, it indicates that the detection pin Pdt has not received the operating voltage Sa.

In some embodiments, the pins the charging IC 151 further include a notification pin (not shown) for use with a notification signal. In an exemplary embodiment, the notification signal has two different levels (hereinafter referred to as the third level and the fourth level.) The notification signal of the third level is the appropriate signal. Hence, if the notification pin outputs the notification signal of the fourth level, it indicates that the charging IC 151 has not generated the appropriate signal.

In some embodiments, the charging IC 151 comprises therein an enable circuit, an output circuit, a bus interface, a voltage-current comparing circuit, a selection circuit, a PWM circuit, and a switch signal generating circuit.

The enable circuit is coupled between the detection pin Pdt and the drive output pin Prg. The enable circuit generates the driving signal according to the operating voltage Sa received by the detection pin Pdt and outputs the driving signal through the drive output pin Prg. In an exemplary embodiment, the enable circuit comprises a first comparator, a second comparator, a logic component, and a generator. The first comparator is coupled to the detection pin Pdt. The first comparator compares the electric potential (such as the operating voltage Sa) of the detection pin Pdt with a waking voltage level to thereby generate the first comparison result. The second comparator is coupled to a power supply pin (not shown). The second comparator compares the detection pin Pdt with an upper limit of power supply to thereby generate the second comparison result. The logic component is coupled to the output of the first comparator, the output of the second comparator, and the input of a signal generator. The logic component outputs an enable signal to the signal generator according to the first comparison result and the second comparison result such that the signal generator outputs the driving signal. The waking voltage level is fixed, say, 0.6V. The upper limit of power supply is fixed, say, 3.75V.

The input end of the output circuit is coupled to a switch signal generating circuit. The input end of the output circuit is coupled to the switch-controlling pins Phd, Pld. The driving end of the output circuit is coupled to the enable circuit and the switch-driving pins Pbt, Pph. Hence, if the detection pin Pdt receives the operating voltage Sa, the enable circuit generates the driving signal for driving the output circuit to output a switch signal generated from the switch signal generating circuit to the control ends G1, G2 of the switch circuit 153 through the switch-controlling pins Phd, Pld. Conversely, unless the detection pin Pdt receives the operating voltage Sa, the enable circuit will not generate the driving signal, thereby disabling the output circuit; meanwhile, the charging IC 151 stops operating (that is, stops the charging unit 150 from outputting the charging current Io).

In some embodiments, the bus interface is coupled to the command input pin Ps2 and receives the control command Sc from the control unit 110 through the command input pin Ps2. The control command Sc comprises a first current limitation reference, a second current limitation reference, a voltage reference, a selection signal, and a start signal.

The voltage-current comparing circuit is electrically connected to the command input pin Ps2 and coupled to the input current detection pins Pan, Pap, the current-limiting pin Pii, and the output current detection pins Psn, Psp. The voltage-current comparing circuit detects the input current Ii according to the first current limitation reference to thereby generate the first detection result, detects the charging current Io according to the second current limitation reference to thereby generate the second detection result, detects the output voltage Vo measured through the output current detection pin Psn according to voltage reference to thereby generate the third detection result, and detects the input current Ii according to the current limitation received by the current-limiting pin Pii to thereby generate the fourth detection result. In an exemplary embodiment, in the voltage-current comparing circuit, a first differential amplifier measures the input current Ii through the input current detection pins Pan, Pap, a second differential amplifier calculates the first difference (the first detection result) between the measured value of the input current Ii and the first current limitation reference, a third differential amplifier measures the charging current Io through the output current detection pins Psn, Psp, and a fourth differential amplifier calculates the second difference (the second detection result) between the measured value of the charging current Io and the second current limitation reference. A fifth differential amplifier is coupled to the output current detection pin Psn through a voltage dividing circuit. The fifth differential amplifier receives a feedback value of the output voltage Vo through the output current detection pin Psn and the voltage dividing circuit and calculates the third difference (the third detection result) between the feedback value of the output voltage Vo and the voltage reference. A sixth differential amplifier is coupled to the output of the third differential amplifier and the current-limiting pin Pii and calculates the fourth difference (the fourth detection result) between the measured value of the charging current Io and the current limitation. Afterward, a summation circuit integrates the first difference, the second difference, the third difference, and the fourth difference and then outputs the summation result to the PWM circuit.

The selection circuit is coupled between the voltage-current comparing circuit and the current feedback pin Pio. The selection circuit outputs the measured value of the charging current Io or the measured value of the charging current Io, which is generated from the voltage-current comparing circuit, according to the selection signal. In the aforesaid exemplary embodiment, the input end of the selection circuit is coupled to the output of the first differential amplifier and the output of the third differential amplifier, whereas the output end of the selection circuit is coupled to the current feedback pin Pio. The control end of the selection circuit is coupled to the bus interface.

The PWM circuit generates a PWM signal according to the first detection result, the second detection result, the third detection result, and the fourth detection result.

The switch signal generating circuit is coupled between the PWM circuit and the output circuit. After receiving the start signal, the switch signal generating circuit generates a switch signal according to the PWM signal. Therefore, if the control unit 110 determines that the detected voltage Vd falls within the operation range, the control unit 110 not only outputs the conducting voltage So but also outputs the control command Sc to the charging IC 151. The switch signal generating circuit of the charging IC 151 functions well, because of the start signal of the control command Sc. Conversely, if the control unit 110 determines that the detected voltage Vd does not fall within the operation range, the control unit 110 neither outputs the conducting voltage So nor outputs the control command Sc to the charging IC 151. The switch signal generating circuit of the charging IC 151 has not received the start signal and thus is disabled. At this point in time, the charging IC 151 stops operating (that is, stops the charging unit 150 from outputting the charging current Io).

Figure 3:
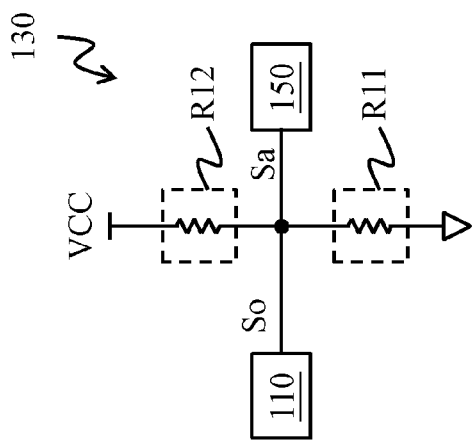
FIG. 3 is a circuit diagram of a conversion unit of FIG. 1 according to an embodiment of the present disclosure.

In an embodiment, referring to FIG. 1 and FIG. 3, the conversion unit 130 is a voltage dividing circuit. The voltage dividing circuit comprises two voltage divider components (hereinafter referred to as the first voltage divider component R11 and the second voltage divider component R12). The first end of the second voltage divider component R12 is coupled to a voltage source (which supplies a predetermined voltage VCC). The second end of the second voltage divider component R12 is coupled to the control unit 110, the detection pin Pdt, and the first end of the first voltage divider component R11. The second end of the first voltage divider component R11 is coupled to the ground. The conducting voltage So is of a high level. The operating voltage Sa is a voltage component of the predetermined voltage VCC on the first voltage divider component R11. Conversely, if the control unit 110 determines that the detected voltage Vd does not fall within the operation range, the control unit 110 reduces the electric potential of the detection pin Pdt to a low level, that is, does not output the conducting voltage So.

Figure 4:
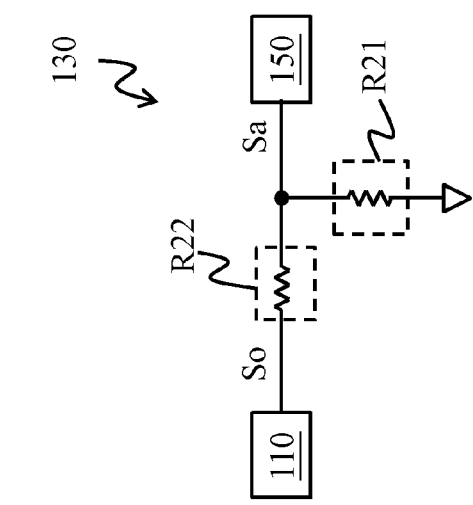
FIG. 4 is a circuit diagram of the conversion unit of FIG. 1 according to another embodiment of the present disclosure.

In another embodiment, referring to FIG. 1 and FIG. 4, the conversion unit 130 is a voltage dividing circuit. The voltage dividing circuit comprises two voltage divider components (hereinafter referred to as the first voltage divider component R21 and the second voltage divider component R22). The first end of the second voltage divider component R22 is coupled to the control unit 110. The second end of the second voltage divider component R22 is coupled to the detection pin Pdt of the charging unit 150 and the first end of the first voltage divider component R21. The second end of the first voltage divider component R21 is coupled to the ground. The operating voltage Sa is a voltage component of the conducting voltage So on the first voltage divider component R21.

Figure 5:
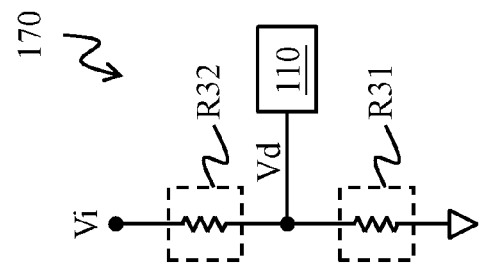
FIG. 5 is a circuit diagram of a voltage detection circuit of FIG. 1 according to an embodiment of the present disclosure.

In an embodiment, referring to FIG. 1 and FIG. 5, the voltage detection circuit 170 is a voltage dividing circuit. The voltage dividing circuit comprises two voltage divider components (hereinafter referred to as the third voltage divider component R31 and the fourth voltage divider component R32). The fourth voltage divider component R32 and the third voltage divider component R31 are series-connected between the power input end Ni and the ground. The juncture of the third voltage divider component R31 and the fourth voltage divider component R32 is coupled to the control unit 110. The detected voltage Vd is a voltage component of the input voltage Vi, that is, a voltage component of the input voltage Vi on the third voltage divider component R31.

In some embodiments, the charging circuit 10 further comprises a voltage-stabilizing circuit 190. The voltage-stabilizing circuit 190 is coupled between the power input end Ni and the charging unit 150. Therefore, the voltage-stabilizing circuit 190 receives the input voltage Vi through the power input end Ni and thereby supplies the stable input voltage Vi to a backend circuit (the charging unit 150). In an exemplary embodiment, the voltage-stabilizing circuit 190 comprises one or more Zener diodes parallel-connected between the power input end Ni and the charging unit 150.

In some embodiments, the control unit 110 is a microcontroller.

Figure 6:
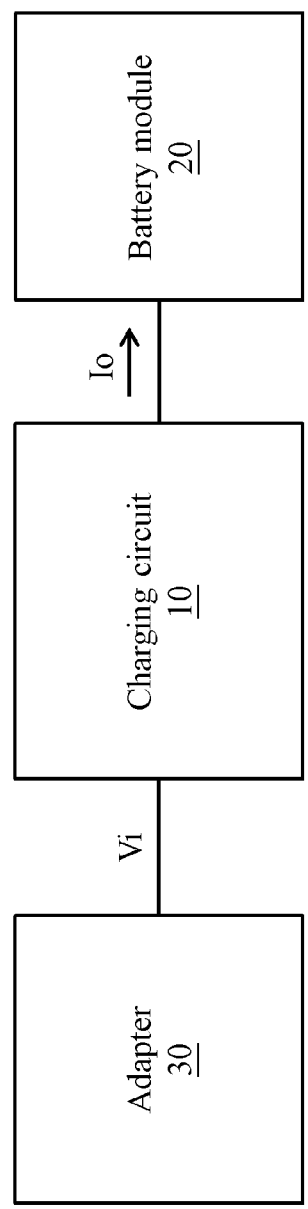
FIG. 6 is a function block diagram of the charging circuit of FIG. 1.

In some embodiments, the power output end No of the charging circuit 10 is coupled to a battery module 20, as shown in FIG. 1 and FIG. 6. For instance, in an exemplary embodiment, assuming that the charging circuit 10 is a built-in circuit of a self-contained charging device (for example, a charger or a charging dock), the power output end No is electrically connected to a connector of the battery module 20. The charging circuit 10 outputs the resultant charging current Io to the battery module 20 through the connector, so as to charge the battery module 20. In another exemplary embodiment, assuming that the charging circuit 10 is a built-in circuit of an electronic device (a portable electronic product, such as a mobile phone, a laptop or a tablet), the power output end No is a wiring juncture. The wiring juncture is electrically connected to the battery module 20. The charging circuit 10 outputs the resultant charging current Io to the battery module 20, so as to charge the battery module 20.

In some embodiments, the power input end Ni of the charging circuit 10 is coupled to an adapter circuit 30, as shown in FIG. 1 and FIG. 3. The adapter circuit 30 supplies the input voltage Vi. The circuitry of the adapter circuit 30 is well known among persons skilled in the art and thus is not reiterated herein.

In conclusion, a charging circuit and a method of controlling charging according to any embodiment of the present disclosure replace the charging IC with the control unit 110 for monitoring the input voltage Vi and control the operation of the charging IC 151, so as to not only increase an appropriate range of the input voltage Vi but also prevent leakage current from happening to the power output end No before charging.

Although the present disclosure is disclosed above by preferred embodiments, the preferred embodiments are not restrictive of the present disclosure. Any persons skilled in the art can make some changes and modifications to the preferred embodiments without departing from the spirit of the present disclosure. Accordingly, the legal protection for the present disclosure should be defined by the appended claims.

What is claimed is:

1. A method of controlling charging, comprising the steps of:
   receiving an input voltage;
   receiving by a control unit a detected voltage related to the input voltage;
   outputting a conducting voltage from the control unit when the detected voltage falls within an operation range;
   outputting an operating voltage to a detection pin of a charging unit according to the conducting voltage;
   outputting a charging current from the charging unit according to the input voltage when the detection pin receives the operating voltage; and
   not outputting the conducting voltage from the control unit when the detected voltage falls outside the operation range;
   wherein the charging unit has an allowable range which the operating voltage falls within, with the operation range being greater than the allowable range;
   wherein the allowable range comprising a first voltage level and a second voltage level which is higher than first voltage level; the operation range comprising a third voltage level and a fourth voltage level which is higher than the third voltage level.

2. The method of controlling charging of claim 1, wherein the charging unit has an allowable range which the operating voltage falls within, with the operation range being greater than the allowable range.

3. The method of controlling charging of claim 1, further comprising stopping the charging unit from outputting the charging current when the detection pin has not received the operating voltage.

4. The method of controlling charging of claim 1, wherein the step of outputting the operating voltage according to the conducting voltage entails dividing the conducting voltage so as to generate the operating voltage.

5. The method of controlling charging of claim 1, wherein the step of outputting the operating voltage according to the conducting voltage entails dividing a predetermined voltage in presence of the conducting voltage so as to generate the operating voltage, and the step of not outputting the conducting voltage from the control unit entails reducing a voltage of the detection pin to a ground by the control unit.

6. The method of controlling charging of claim 1, further comprising dividing the input voltage so as to generate the detected voltage.

7. A charging circuit, comprising:
a power input end for receiving an input voltage;
a power output end for outputting a charging current;
a voltage detection circuit coupled to the power input end to output a detected voltage according to the input voltage, wherein the detected voltage is related to the input voltage;
a control unit coupled to the voltage detection circuit to detect the detected voltage according to an operation range, wherein the control unit outputs a conducting voltage when the detected voltage falls within the operation range but does not output the conducting voltage when the detected voltage falls outside the operation range;
a conversion unit coupled to the control unit to output an operating voltage according to the conducting voltage; and
a charging unit coupled between the power input end and the power output end, having a detection pin coupled to the conversion unit, and generating the charging current according to the input voltage when the detection pin receives the operating voltage;
wherein the charging unit has an allowable range which the operating voltage falls within, with the operation range being greater than the allowable range;
wherein the allowable range comprising a first voltage level and a second voltage level which is higher than first voltage level; the operation range comprising a third voltage level and a fourth voltage level which is higher than the third voltage level.

8. The charging circuit of claim 7, wherein the charging unit has an allowable range which the operating voltage falls within, with the operation range being greater than the allowable range.

9. The charging circuit of claim 7, wherein the charging unit does not output the charging current when the detection pin has not received the operating voltage.

10. The charging circuit of claim 7, wherein the conversion unit comprises a first voltage divider component and a second voltage divider component, the second voltage divider component having a first end coupled to the control unit and a second end coupled between the detection pin and a first end of the first voltage divider component, wherein a second end of the first voltage divider component is coupled to a ground, with the operating voltage being a voltage component of the conducting voltage on the first voltage divider component.

11. The charging circuit of claim 7, wherein the conversion unit comprises a first voltage divider component and a second voltage divider component, the second voltage divider component having a first end coupled to a predetermined voltage and a second end coupled to the control unit, the detection pin, and a first end of the first voltage divider component, the first voltage divider component being coupled to a ground, and the operating voltage being a voltage component of the predetermined voltage on the first voltage divider component.

12. The charging circuit of claim 7, wherein the voltage detection circuit comprises a plurality of voltage divider components electrically connected between the power input end and a ground, and a juncture of the voltage divider components is coupled to the control unit, with the detected voltage being a voltage component of the input voltage.

* * * * *